US012732942B2

(12) United States Patent
Keating et al.

(10) Patent No.: US 12,732,942 B2
(45) Date of Patent: Sep. 8, 2026

(54) GEO-FENCED BANDWIDTH SWITCHING FOR REDUCED CAPABILITY DEVICES

(71) Applicant: Nokia Technologies Oy, Espoo (FI)

(72) Inventors: Ryan Keating, Naperville, IL (US); Diomidis Michalopoulos, Munich (DE); Stepan Kucera, Munich (DE); Jürgen Hofmann, Munich (DE); Berthold Panzner, Munich (DE)

(73) Assignee: Nokia Technologies Oy, Espoo (FI)

( * ) Notice: Subject to any disclaimer, the term of this patent is extended or adjusted under 35 U.S.C. 154(b) by 520 days.

(21) Appl. No.: 18/359,670

(22) Filed: Jul. 26, 2023

(65) Prior Publication Data

US 2024/0114475 A1 Apr. 4, 2024

(30) Foreign Application Priority Data

Sep. 29, 2022 (GB) ..................................... 2214267

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC ........ G01S 5/014; G01S 5/019; G01S 5/0236; G01S 5/0244; H04L 5/0051; H04W 64/00; H04W 64/003
See application file for complete search history.

(56) References Cited

U.S. PATENT DOCUMENTS

| | | | | |
|---|---|---|---|---|
| 10,715,951 | B1 * | 7/2020 | Ratasuk ................ | H04W 24/10 |
| 2021/0029507 | A1 | 1/2021 | Khoryaev et al. | |
| 2022/0120841 | A1 | 4/2022 | Fischer et al. | |
| 2022/0295594 | A1 | 9/2022 | Spapis et al. | |
| 2023/0047361 | A1 * | 2/2023 | Bao ....................... | H04W 72/51 |

(Continued)

FOREIGN PATENT DOCUMENTS

| | | | |
|---|---|---|---|
| WO | 2020/249294 | A1 | 12/2020 |
| WO | 2023/275044 | A1 | 1/2023 |

(Continued)

OTHER PUBLICATIONS

Extended European Search Report received for corresponding European Patent Application No. 23181928.5, dated Feb. 12, 2024, 11 pages.

(Continued)

*Primary Examiner* — Nader Bolourchi
(74) *Attorney, Agent, or Firm* — Nokia Technologies Oy

(57) ABSTRACT

Geo-fenced bandwidth switching for Reduced Capability NR devices is provided. An apparatus may include at least one processor, and at least one memory storing instructions. The stored instructions, when executed by the processor, cause the terminal device at least to receive, from a network element, information comprising a plurality of characteristics of a geo-fence having two or more precision zones configured for two or more positioning uncertainties for the terminal device. The apparatus is further caused at least to apply a precision zone selected from the two or more precision zones in accordance with a current location of the terminal device in communication of a reference signal for positioning of the terminal device.

20 Claims, 6 Drawing Sheets

(56) References Cited

U.S. PATENT DOCUMENTS

| | | | | |
|---|---|---|---|---|
| 2024/0163908 | A1* | 5/2024 | Alawieh | H04L 5/0094 |
| 2024/0353518 | A1* | 10/2024 | Barbu | G01S 5/0036 |

FOREIGN PATENT DOCUMENTS

| | | | |
|---|---|---|---|
| WO | 2023/019042 | A1 | 2/2023 |
| WO | 2023/043461 | A1 | 3/2023 |

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 5 pages.
"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.
"New WID: NR Positioning Support", 3GPP TSG RAN Meeting #83, RP-190752, Agenda: 9.1.1, Intel Corporation, Mar. 18-21, 2019, 6 pages.
"Revised WID on NR Positioning Enhancements", 3GPP TSG RAN Meeting #91e, RP-210897, Agenda: 9.7.25, Intel Corporation, Mar. 16-26, 2022, 6 pages.
"Revised WID on support of reduced capability NR devices", 3GPP TSG RAN Meeting #92e, RP-211574, Agenda: 9.7.1.7, Ericsson, Jun. 14-18, 2021, 6 pages.
"Msc-generator", Sourceforge, Retrieved on Aug. 23, 2023, Webpage available at : https://sourceforge.net/projects/msc-generator/.
"3rd Generation Partnership Project; Technical Specification Group Radio Access Network; LTE Positioning Protocol (LPP) (Release 17)", 3GPP TS 37.355, V17.0.0, Mar. 2022, pp. 1-340.
"3rd Generation Partnership Project; Technical Specification Group Radio Access Network; NR; Physical layer procedures for data (Release 17)", 3GPP TS 38.214, V17.2.0, Jun. 2022, pp. 1-228.
Search Report received for corresponding United Kingdom Patent Application No. 2214267.3, dated Mar. 9, 2023, 4 pages.
"3rd Generation Partnership Project; Technical Specification Group Services and System Aspects; Study on positioning use cases; Stage 1 (Release 16)", 3GPP TR 22.872, V1.1.0, May 2018, pp. 1-75.
"Adding description for use case family on Higher accuracy positioning to TR on CriC", 3GPP TSG-SA WG1 Meeting #73, S1-160152, Agenda: 8.3, Nokia Networks, Feb. 1-5, 2016, 2 pages.
"Design Aspects for NR DL Positioning", 3GPP TSG RAN WG1 Meeting #96, R1-1902511, Agenda: 7.2.10.1.1, Intel Corporation, Feb. 25-Mar. 1, 2019, pp. 1-23.
"Considerations on Downlink based Positioning in NR", 3GPP TSG RAN WG1 #96, R1-1902188, Agenda: 7.2.10.1.1, Sony, Feb. 25-Mar. 1, 2019, 8 pages.

* cited by examiner

GEO-FENCED BANDWIDTH SWITCHING FOR REDUCED CAPABILITY DEVICES

RELATED APPLICATION

This application claims priority to GB Patent Application No. 2214267.3, filed Sep. 29, 2022, the content of which is incorporated herein by reference in its entirety.

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to geo-fenced bandwidth switching for Reduced Capability (RedCap) NR devices.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide a terminal device, which may include at least one processor, and at least one memory storing instructions. The stored instructions, when executed by the at least one processor, may cause the terminal device at least to receive, from a network element, information including a plurality of characteristics of one or more precision zones configured for the terminal device. The terminal device may be further caused to apply a precision zone selected from the one or more precision zones in accordance with a current location of the terminal device in communication of a reference signal for positioning of the terminal device.

Various exemplary embodiments may provide a network device, which may include at least one processor, and at least one memory storing instructions. The stored instructions, when executed by the at least one processor, may cause the network device at least to receive configuration information of a location of a terminal device relative to one or more precision zones. The network device may also be caused to generate and transmit, to the terminal device, a positioning reference signal configured for a precision zone selected from one of the one or more precision zones in which the terminal device is located for positioning of the terminal device.

Some exemplary embodiments may provide a network device, which may include at least one processor, and at least one memory storing instructions. The stored instructions, when executed by the at least one processor, may cause the network device at least to determine information including a plurality of characteristics of one or more precision zones configured for a terminal device. The network device may also be caused to transmit, to the terminal device, the determined plurality of characteristics of one or more precision zones to cause the terminal device to apply a precision zone selected from the one or more precision zones in accordance with a current location of the terminal device in communication of a reference signal for positioning of the terminal device.

Some exemplary embodiments may provide a method including receiving, from a network element, information including a plurality of characteristics of one or more precision zones configured for a terminal device. The method may also include applying a precision zone selected from the one or more precision zones in accordance with a current location of the terminal device in communication of a reference signal for positioning of the terminal device.

Certain exemplary embodiments may provide a method including receiving configuration information of a location of a terminal device relative to one or more precision zones. The method may also include generating and transmitting, to the terminal device, a positioning reference signal configured for a precision zone selected from one of the one or more precision zones in which the terminal device is located for positioning of the terminal device.

Certain exemplary embodiments may provide a method including determining information including a plurality of characteristics of one or more precision zones configured for a terminal device. The method may also include transmitting, to the terminal device, the determined plurality of characteristics of one or more precision zones to cause the terminal device to apply a precision zone selected from the one or more precision zones in accordance with a current location of the terminal device in communication of a reference signal for positioning of the terminal device.

BRIEF DESCRIPTION OF THE DRAWINGS

For proper understanding of example embodiments, reference should be made to the accompanying drawings, as follows.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for geo-fenced bandwidth switching for RedCap devices. Although the devices discussed below and shown in the figures refer to RedCap devices, this disclosure is not limited to only RedCap devices. For example, the following description may also apply to any user equipment (UE), such as a low power high accuracy positioning (LPHAP) device. The UE may also be radio resource control (RRC) connected or RRC inactive while performing positioning processes, such as measurements and/or transmission, according to the various exemplary embodiments discussed below.

RedCap UE may be applied in new IoT use cases, such as industrial wireless sensors, video surveillance, and wearables. RedCap UE may be targeted to meet design requirements of lower device cost and complexity compared with eMBB and URLLC devices. RedCap UE may also benefit from improved power consumption management, such as, for example, longer battery life than an NR UE. Advantages to the positioning capabilities of RedCap UEs may also be provided, including supporting low power high accuracy positioning (LPHAP), in certain situations. Thus, it may be beneficial to provide enhancements that provide balance reducing power consumption while a desired accuracy for positioning of the RedCap UE.

Positioning procedures for RedCap UEs may rely on at least two positioning states, such as a position fix state and a position track state. Each positioning state may have a reference signal for positioning purposes. For example, a positioning reference signal (PRS) and/or a sounding reference signal (SRS) configuration for the RedCap UE. The RedCap UE may be informed, or may determine for itself, when to switch between the different positioning states.

Positioning procedures for RedCap UEs may be performed for uplink (UL), downlink (DL), and/or sidelink (SL) communications. SL communications may be related to direct communications between UEs, such as vehicle-to-vehicle, vehicle-to-anything, or the like. For UEs performing SL communications, different locations may be associated with different SL discontinuous reception (SL-DRX) configurations, such that the UE may be configured with multiple SL-DRX configurations in multiple geographic areas.

Figure 1:
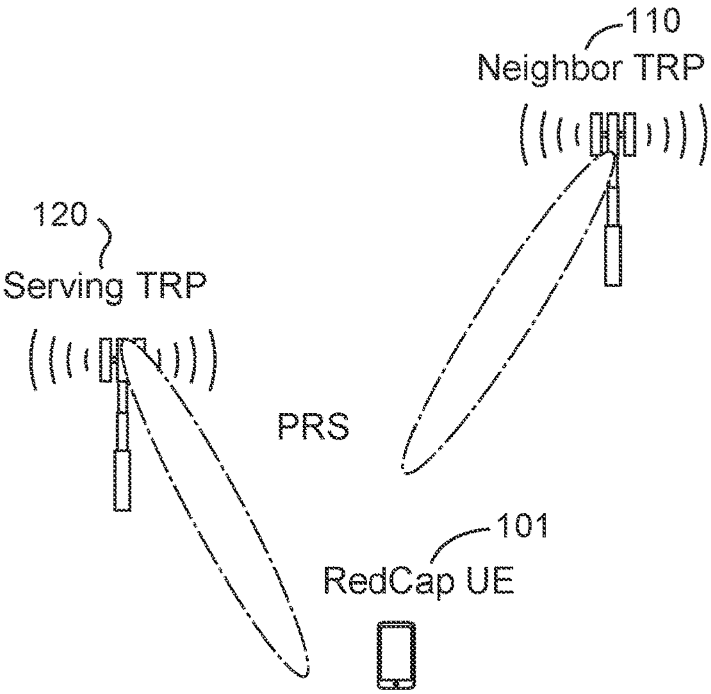
FIG. 1 illustrates an example of a structural configuration of a RedCap device and transmission reception points (TRP) for positioning the RedCap device.

FIG. 1 illustrates a RedCap UE 101 located in relative proximity to multiple transmission reception points (TRP) 110 and 120. RedCap UEs, such as the RedCap UE 101, may have limited bandwidth (BW), which may degrade or inhibit the positioning performance. For example, the positioning performance may be proportional to a maximum bandwidth in a zone in which the RedCap UE 101 may be located.

Figure 2:
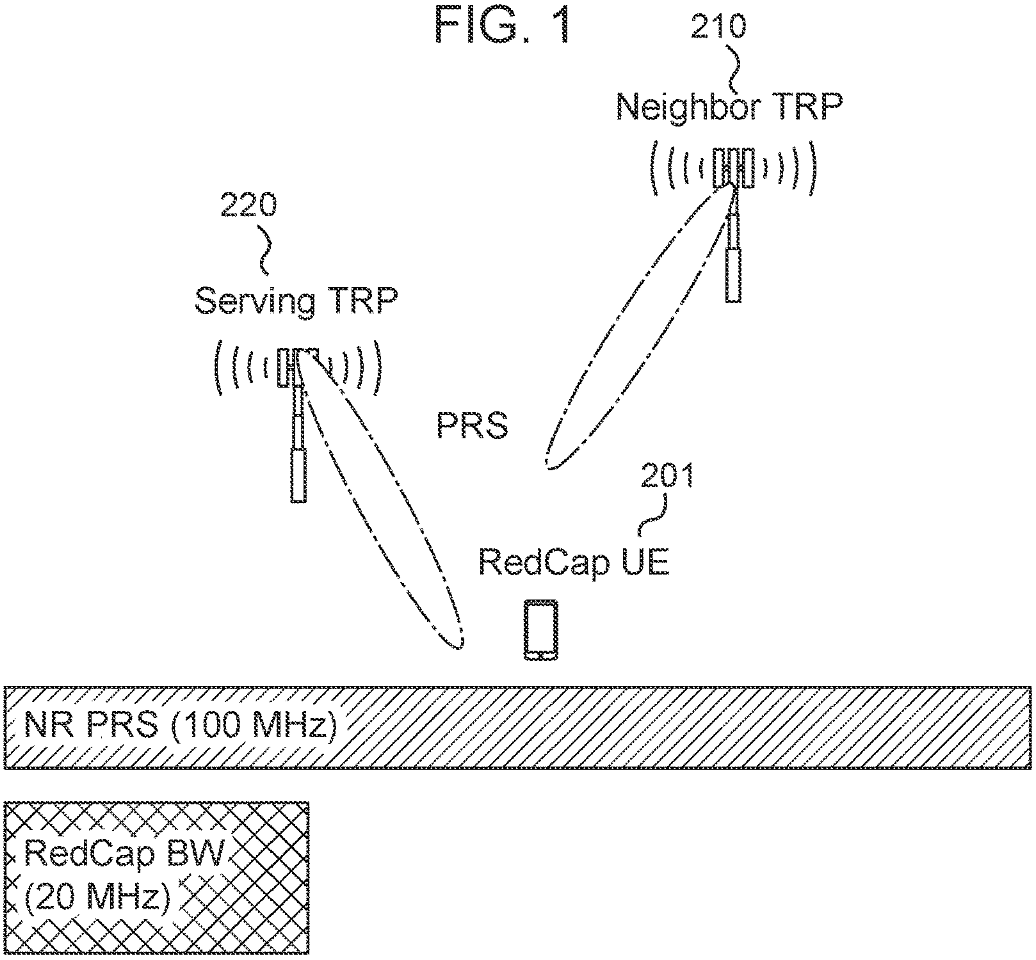
FIG. 2 illustrates an example of a structural configuration of a RedCap device and TRPs for positioning the RedCap device with multiple bandwidths.

FIG. 2 illustrates a configuration similar to FIG. 1, in which a RedCap UE 201 is located in relative proximity to multiple transmission reception points (TRP) 210 and 220. Some exemplary embodiments may reduce the complexity of RedCap UEs by focusing on reducing the RedCap UE bandwidth in a lower frequency band, such as frequency range 1 (FR1) as compared to a higher frequency band, such as frequency range 2 (FR2). For example, as shown in FIG. 2, in FR1, the UE bandwidth may be limited to 20 MHz, and in FR2, the RedCap UE bandwidth may be limited to 100 MHz. These exemplary limits on the RedCap UE bandwidth in FR1 and FR2 are not intended to limit the scope of the embodiments defined herein. Other bandwidth limits, or additional bandwidth limits, may be used as necessary or desirable, and/or the features described herein may be applied to other frequency ranges or bandwidths.

Various exemplary embodiments may provide improved positioning procedures by geo-fencing RedCap UEs to adapt to RedCap UE power consumption to manage a desired accuracy in positioning relative to the power consumption.

Figure 3:
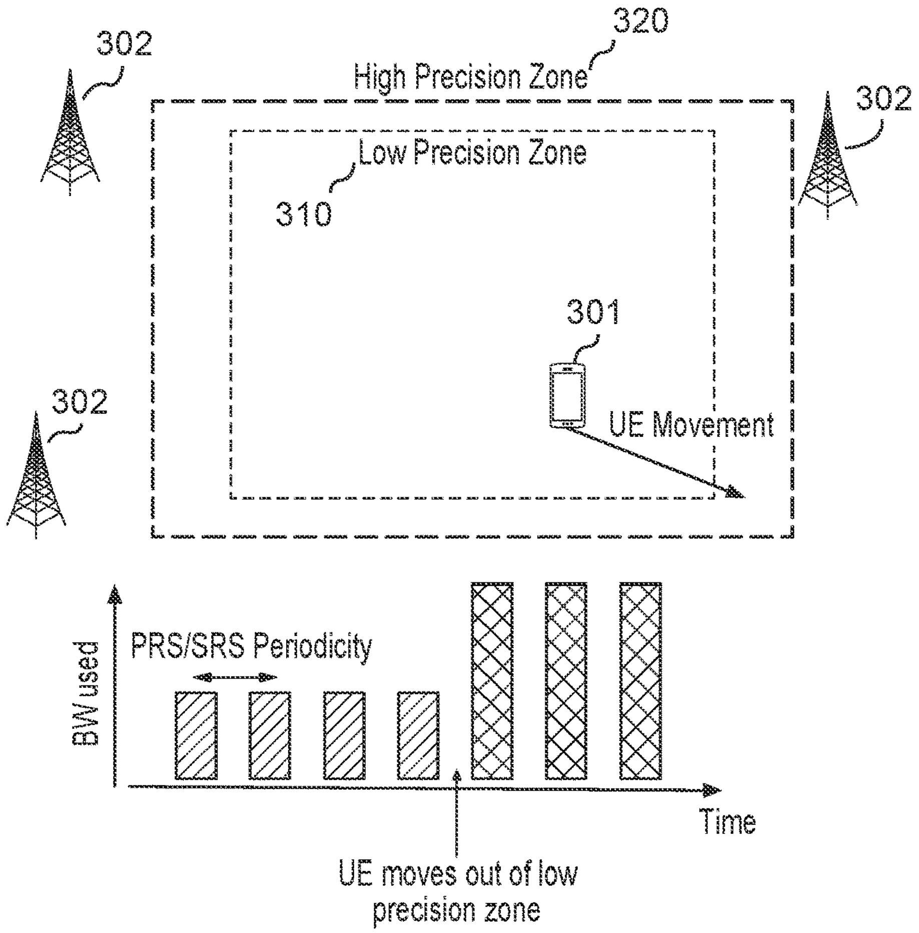
FIG. 3 illustrates an example of multiple precision zones for the RedCap UE using a positioning reference signal (PRS) and/or a sounding reference signal (SRS) according to various exemplary embodiments.

FIG. 3 illustrates an example according to various exemplary embodiments in which the RedCap UE 301 may be configured with one or more geo-fence (or precision) zones to help reduce the amount of time the RedCap UE 301 may need to use a higher bandwidth, such as 100 MHz, for determining the RedCap UE's position. As shown in FIG. 3, the one or more precision zones may include a low precision zone 310 corresponding to a 5 MHz bandwidth, and a high precision zone 320 corresponding to the 100 MHz bandwidth. Other bandwidth limits may be used as necessary or desirable, and/or the features described herein may be applied to other frequency ranges or bandwidths.

As discussed above, in the low precision zone 310, the RedCap UE 101/201/301 may use a 5 MHz bandwidth for PRS and/or SRS. In the high precision zone 320, the RedCap UE 101/201/301 may switch to FR2 and/or use frequency hopping to increase an available bandwidth. The high precision zone 320 may be configured, for example, for implementation in IoT around objects or machinery.

FIG. 3 illustrates, using dashed lines, a border between the low precision zone 310 and the high precision zone 320. This border may be set or determined based on an expected uncertainty of the low precision zone 310 and the Redcap UE speed. The expected uncertainty may be determined by a number of factors including likelihood of line of sight (LOS) links, PRS/SRS measurement quality metrics, and/or PRS/SRS bandwidth of signals used in the positioning measurements. For example, the RedCap UE 101/201/301 with high likelihood of LOS links, high PRS/SRS measurement quality metrics, and high PRS/SRS bandwidth may have a low value of the expected uncertainty. This example may occur when the location is known with high certainty.

In addition to the high precision zone 320 and the low precision zone 310, certain exemplary embodiments may also provide a zone in which the RedCap UE 101/201/301 does not need to measure a PRS and/or transmit an SRS. This zone may be referred to as a "safe zone." For example, the safe zone may be located at or near a center of the low precision zone. However, the exemplary embodiments are not limited to this location of the safe zone. Other locations of the safe zone may be used as necessary or desirable, and/or the features described herein may be applied to multiple safe zones.

For transition from a safe zone to the low precision zone 310, and vice versa, the RedCap UE 101/201/301 may use available serving cell measurements to determining the transition. The serving cell measurements may include one or more of, for example, a change of synchronization signal (SS) reference signal received power (SS-RSRP), SS reference signal received quality (SS-RSRQ), SS signal to interference plus noise ratio (SS-SINR), a number of autonomous timing adjustments, and timing advance (TA) command reception. The process may be extended to multiple precision zones with corresponding gradual actions on bandwidth usage and power consumption.

Although FIG. 3 shows three 5G or Next Generation NodeBs (gNBs) 302, also referred to as base stations herein, the various exemplary embodiments are not limited to three base stations. The number of gNBs 302 involved in each of the geo-fence precision zones may vary (for example, fewer gNBs 302 for low precision) taking geometric dilution of precision (GDOP) into account.

Figure 4:
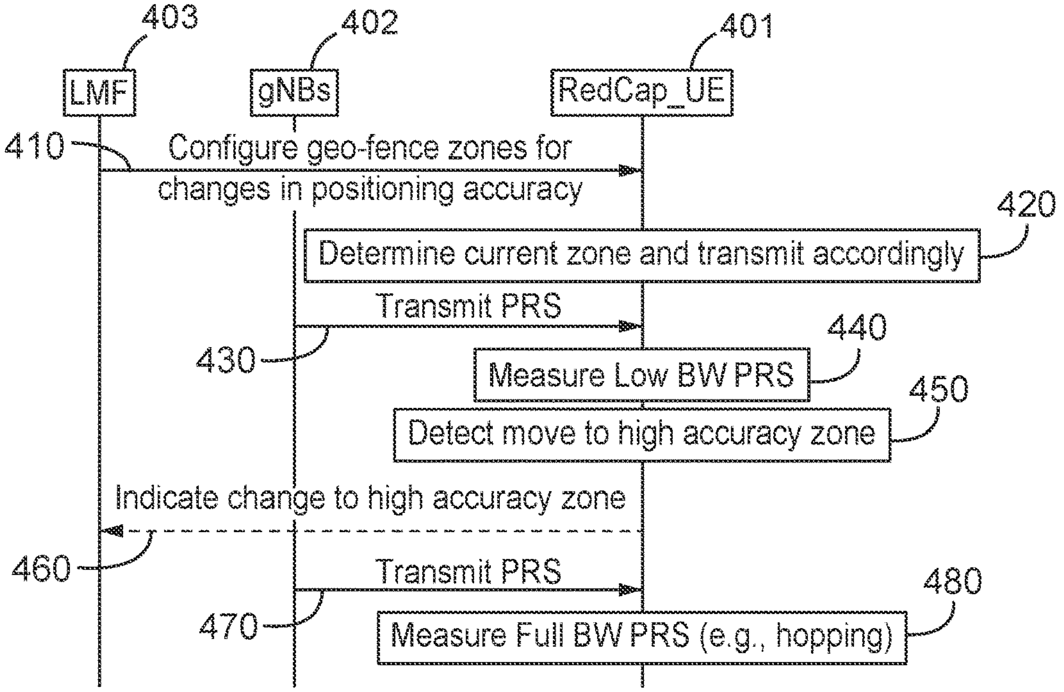
FIG. 4 illustrates an example of a signal flow for geo-fenced bandwidth switching at the RedCap UE during an uplink configuration according to certain exemplary embodiments.

FIG. 4 illustrates an example of signal flows according to some exemplary embodiments from the perspective of a RedCap UE 401. FIG. 4 illustrates an implementation of DL scenario in which the RedCap UE (e.g., 101/201/301/401) is receiving a PRS. However, the exemplary embodiments are not limited to this implementation. Certain exemplary embodiments may be implemented in a UL scenario in which the RedCap UE 401 may transmit an SRS for positioning. Similarly, certain exemplary embodiments may be implemented in an SL scenario in which the RedCap UE 401 may receive a sidelink PRS (SL PRS).

At 410, a network element, such as a location management function (LMF) 403, may configure geo-fence precision zones for the RedCap UE 401. The LMF 403 may be part of a core network or a base station, for example, a gNB 402. In another example, the network element may be a gNB 402 that has integrated functions of the LMF 403, or the like. The LMF 403 may transmit information including the precision zones 310/320 to the RedCap UE 401. The information including the precision zones 310/320 may include the position, such as geographical coordinates, of the precision zones 310/320 and characteristics (or rules) of each precision zone (310 and/or 320), which may be used by the RedCap UE 401 to determine the precision zone (310 and/or 320) in which the RedCap UE 401 is located. The characteristics (or rules) may be, for example, that in a low precision zone 310 the RedCap UE 401 may only receive a 5 MHz PRS.

The LMF 403 may assign wider or narrower PRS or SRS bandwidths when, for example, the LMF 403 determines or detects that the RedCap UE 401 may be moving between a high precision zone 320 and the low precision zone 310. As discussed above, this determination or detection that the RedCap UE 401 may be moving between zones may be based on an estimated position of the RedCap UE 401 and/or the characteristics/rules of the precision zone. In the DL scenario, the LMF 403 may use either a PRS on demand or the network operates two "always-on" PRS bandwidths. A measurement period of the PRS can also be reduced in the low precision zone 310, such as only 1 sample per period as compared to 4 samples per period for an unrestricted PRS or SRS bandwidth. Further, the bandwidth may also be reduced in the low precision zone 310.

In the UL scenario, the LMF 403 may assign wider or narrower SRS bandwidths to the RedCap UE 401. The periodicity of transmission of the SRS may be adjusted. For example, the transmission periodicity may be higher for the low precision zone 310 and/or lower for the high precision zone 320.

At 420, the RedCap UE 401 may determine a current precision zone in which the RedCap UE 401 is located based on the most recent location estimation of the position of the RedCap UE 401. The RedCap UE 401 may periodically perform a location determination or estimation. Such a location determination or estimation may be performed in a UE-based manor, such as the RedCap UE 401 calculates the location. The RedCap UE 401 may then receive and/or transmit information, such as the determined current precision zone (310 or 320), according to the characteristic/rule configured for the precision zone and transmitted to the RedCap UE 401 by the LMF 403.

At 430, a network entity, such as the gNB 402, may transmit a PRS to the RedCap UE 401. At 440, the RedCap UE 401 may measure the PRS according to the characteristic/rule. For example, when the RedCap UE 401 determines that the RedCap UE's current location is in the low precision zone 310, the RedCap UE 401 may measure the bandwidth of the PRS corresponding to the low precision zone 310. However, the exemplary embodiments are not limited to this example. In the event that the RedCap UE 401 determines that the RedCap UE's current location is in the high precision zone 320 or a safe zone, the RedCap UE 401 may measure a full bandwidth of the PRS accordingly.

At 450, the RedCap UE 401 may determine that the RedCap UE 401 has moved to another zone. For example, continuing the above-mentioned example, the RedCap UE 401 may move from the low precision zone 310 into the high precision zone 320. In certain exemplary embodiments, the RedCap UE 401 may use information on uncertainty (or precision) of the RedCap UE's positioning measurements to determine whether the RedCap UE 401 has moved to another precision zone (for example, crossed a boundary between precision zones). For example, when the RedCap UE 401 has a higher uncertainty on measurements, the RedCap UE 401 may adapt a boundary between the precision zones that tend towards a safer option. For example, the RedCap UE 401 may default to the high precision zone 320 with a higher bandwidth than the low precision zone 310. A priority between the precision zones may be either fixed or may be configured to the RedCap UE 401. As an example of a fixed priority, the precision zone with higher precision (e.g., the high precision zone 320), for example higher bandwidth/lower periodicity, is set as the default. As an example of a priority configured to the RedCap UE 401, when there is uncertainty between precision zones, the RedCap UE 401 defaults to a predetermined one of the precision zones.

In certain exemplary embodiments, the RedCap UE 401 may use information on the measurement periodicity and a movement speed of the RedCap UE 401 to prepare for switching actions associated with a change in precision zone. The preparation for switching precision zones may include, for example, bandwidth switching or SRS periodicity adaptation. The preparation is performed prior to the RedCap UE 401 crossing the precision zone boundary/border. In certain exemplary embodiments in which the RedCap UE 401 determines the RedCap UE's positioning, the measurement periodicity and location update rate may not be known by other entities on the network, for example, the LMF 403 and/or gNB 402, and may be known only to the RedCap UE 401 locally.

In some exemplary embodiments, at 460, the RedCap UE 401 may indicate to the network that the RedCap UE 401 has moved from one precision zone to another precision zone. The RedCap UE 401 may include information on a distance from the RedCap UE 401 to the boundary/border between precision zones and the location update rate of the RedCap UE 401. The RedCap UE 401 may transmit this information to other network entities, such as the LMF 403 and/or gNB 402, to notify the network on the relative location of the RedCap UE 401 within a newly entered precision zone in which the RedCap UE 401 is located. The information may also include an indication of desired precision for the current precision zone.

At 470, the network entity, such as the gNB 402, may transmit the PRS again, and at 480, the RedCap UE 401 receives the PRS according to the characteristic/rule configured for the precision zone and transmitted to the RedCap UE 401 by the LMF 430 at 410, as discussed above. In the example shown in FIG. 4, the transmitted PRS is for wide/high bandwidth (e.g., 100 or 20 MHz) when the RedCap UE 401 is in the high precision zone 320.

Figure 5:
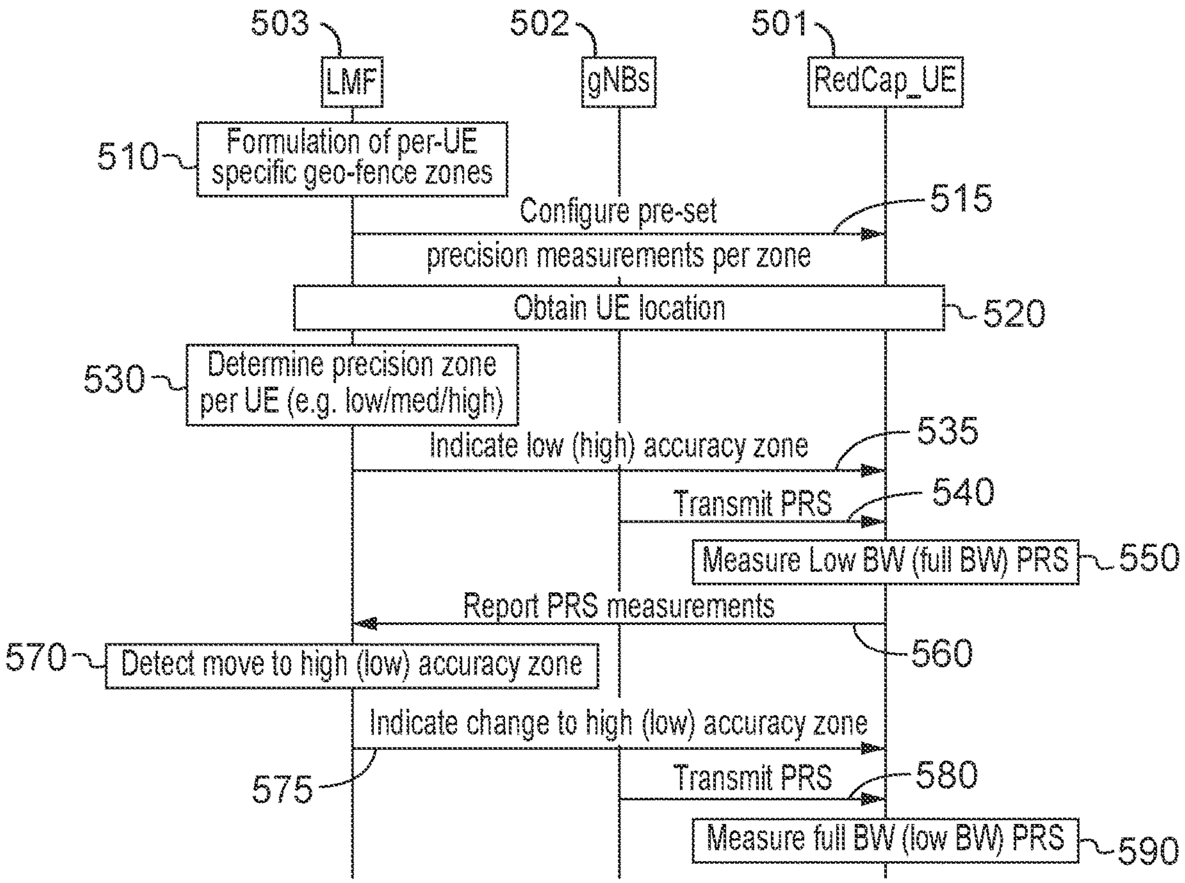
FIG. 5 illustrates an example of a signal flow for geo-fenced bandwidth switching of the RedCap UE at a Location Management Function (LMF) according to certain exemplary embodiments.

FIG. 5 illustrates another downlink example of signal flows according to some exemplary embodiments similar to FIG. 4, except from the perspective of an LMF 503. As discussed above, certain of the below-described procedures performed by the LMF 503 may additionally or alternatively be performed by another network entity, such as a gNB 502.

At 510, the LMF 503 may formulate geo-fence precision zones that may be specific to each RedCap UE 501 connected to the LMF 503. At 515, the LMF 503 may configure pre-set precision measurements for each precision zone, and may transmit the pre-set precision measurements for each formulates precision zone to the RedCap UE 501.

At 520, the RedCap UE 501 location may be determined, and the location of the RedCap UE 501 may be provided to other network entities, such as the LMF 503 and/or the gNB 502. At 530, the LMF 503 may determine which of the formulated precision zones the RedCap UE 501 is located in, such as a low precision zone 310, a medium precision zone, a high precision zone 320, or the like. At 535, the LMF 503 transmits the determined precision zone, which was determined by the LMF 503 at 530, to the RedCap UE 501. At 540, the network entity, such as the gNB 502, may transmit the PRS to the RedCap UE 501.

At 550, the RedCap UE 501 may measure the low bandwidth PRS (e.g., 5 MHz), and at 560, the RedCap UE 501 may transmit the PRS measurement to other network entities, such as the LMF 503. At 570, the LMF 503 detects or determines that the RedCap UE 501 moves from one precision zone to another precision zone, such as the RedCap UE 501 moving from the low precision zone 310 to the high precision zone 320. At 575, the LMF 503 transmits an indication to the RedCap UE 501 to indicate the change in precision zone. For example, a change from the low precision zone 310 to the high precision zone 320.

At 580, the network entity, such as the gNB 502, transmits the PRS to the RedCap UE 501 for the new precision zone, such as the high precision zone 320. At 590, the RedCap UE 501 may measure the bandwidth of the PRS received at 580.

Figure 6:
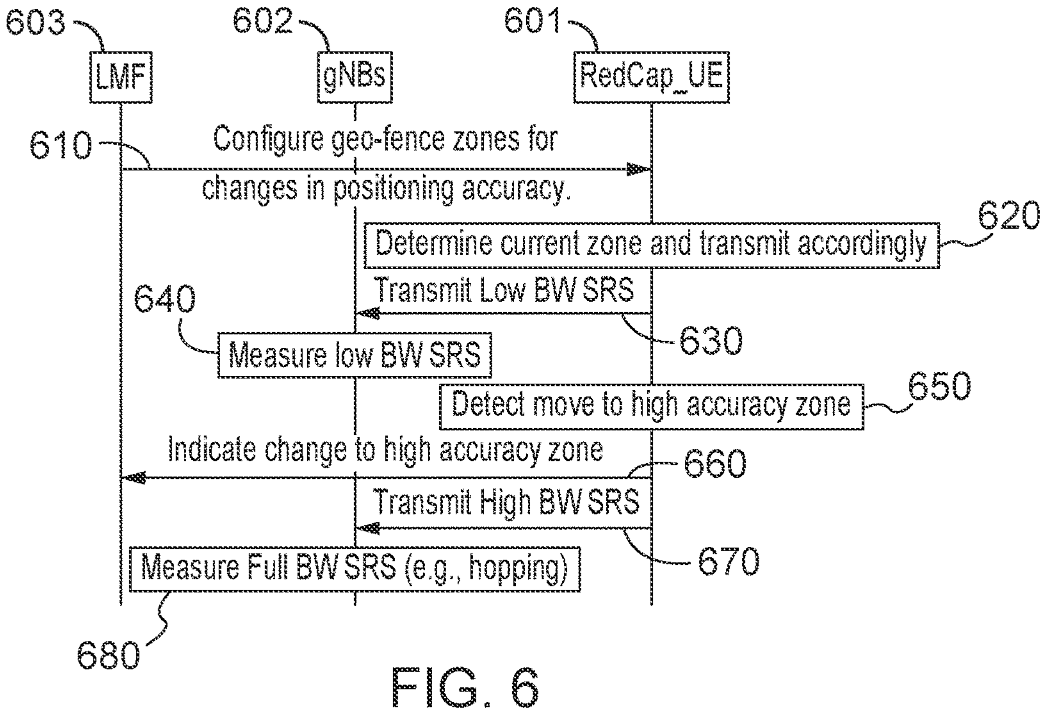
FIG. 6 illustrates an example of a signal flow for geo-fenced bandwidth switching of the RedCap UE during an uplink configuration according to certain exemplary embodiments.

FIG. 6 illustrates an uplink example of signal flows according to some exemplary embodiments similar to FIG. 4.

At 610, the LMF 603 may configure geo-fence precision zones for the RedCap UE 601 for changes in positioning accuracy and may transmit information including the configured precision zones to the RedCap UE 601. The information including the precision zones may include the geographical coordinates of the precision zones and characteristics (or rules) of each precision zone.

At 620, the RedCap UE 601 may determine a current precision zone in which the RedCap UE 601 is located based on the most recent location estimation, and transmit information to one or more of the other network entities, such as the determined current precision zone.

At 630, the RedCap UE 601 may transmit a low bandwidth SRS (e.g., 5 MHz) to one or more other network entities, such as the gNB 602. At 640, the network entity, such as the gNB 602, may measure the received low bandwidth SRS. At 650, the RedCap UE 601 may detect or determine that the RedCap UE 601 has moved to another precision zone, such as a high precision zone 320. As discussed above, in various exemplary embodiments, the RedCap UE 601 may use information on uncertainty (or precision) of the RedCap UE's positioning measurements to determine whether the RedCap UE 601 has moved to another precision zone by, for example, crossing a boundary between precision zones. In certain exemplary embodiments, the RedCap UE 601 may use information on the measurement periodicity and a movement speed of the RedCap UE 601 to prepare for switching actions associated to change in precision zone change.

At 660, the RedCap UE 601 may transmit to the LMF 603 an indication of the change in precision zone, such as the RedCap UE 601 moving from the low precision zone 310 to the high precision zone 320. At 670, the RedCap UE 601 may transmit an SRS corresponding to the new precision zone in which the RedCap UE 601 moved, such as a high bandwidth SRS (e.g., 20 MHz), to other network entities, such as the gNB 602. At 680, the network entity, such as the gNB 602, may measure a full bandwidth SRS (e.g., 20 MHz), such as by frequency hopping.

Figure 7:
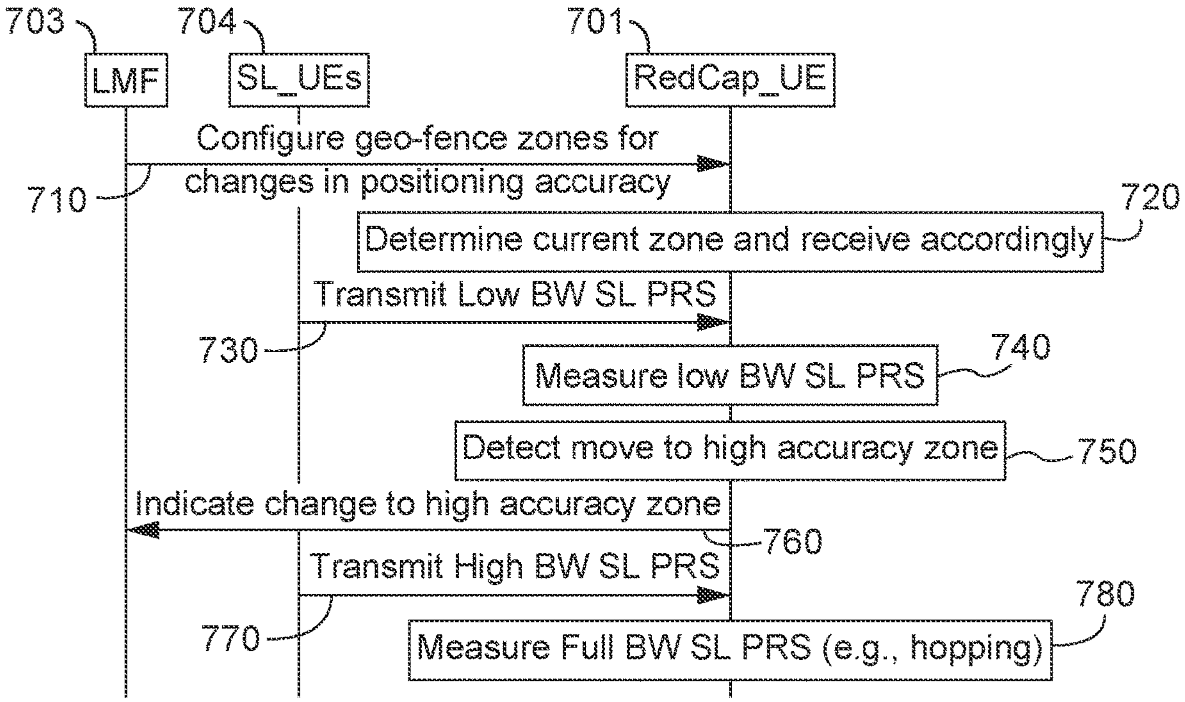
FIG. 7 illustrates an example of a signal flow for geo-fenced bandwidth switching of the RedCap UE during a sidelink configuration according to certain exemplary embodiments.

FIG. 7 illustrates a sidelink example of signal flows according to some exemplary embodiments similar to FIG. 6, except applied for sidelink procedures.

At 710, similar to 610 discussed above with reference to FIG. 6, the LMF 703 may configure geo-fence precision zones for the RedCap UE 701 for changes in positioning accuracy and may transmit information including the configured precision zones to the RedCap UE 701. At 720, the RedCap UE 701 may determine a current precision zone in which the RedCap UE 701 is located based on the most recent location estimation, and transmit information to one or more of the other network entities, such as the determined current precision zone.

At 730, one or more SL UEs 704 may transmit a low bandwidth (e.g., 5 MHz) SL PRS to the RedCap UE 701. At 740, the RedCap UE 701 may measure the low bandwidth SL PRS, which was received from the one or more SL UEs 704. At 750, the RedCap UE 701 may detect or determine that the RedCap UE 701 has moved to another precision zone, such as a high precision zone 320. As discussed above, in various exemplary embodiments, the RedCap UE 701 may use information on uncertainty (or precision) of the RedCap UE's positioning measurements to determine whether the RedCap UE 701 has moved to another precision zone by, for example, crossing a boundary between precision zones.

At 760, the RedCap UE 701 may transmit to the LMF 703 an indication of the change in precision zone, such as the RedCap UE 701 moving from the low precision zone 310 to the high precision zone 320. At 770, the one or more SL UEs 704 may transmit to the RedCap UE 701 a high bandwidth (e.g, 20 MHz) SL PRS corresponding to the new precision zone in which the RedCap UE 701 moved, such as a high bandwidth SL PRS. At 780, the RedCap UE 701 may measure a full bandwidth (e.g., 20 MHz) SL PRS, such as by frequency hopping.

Figure 8:
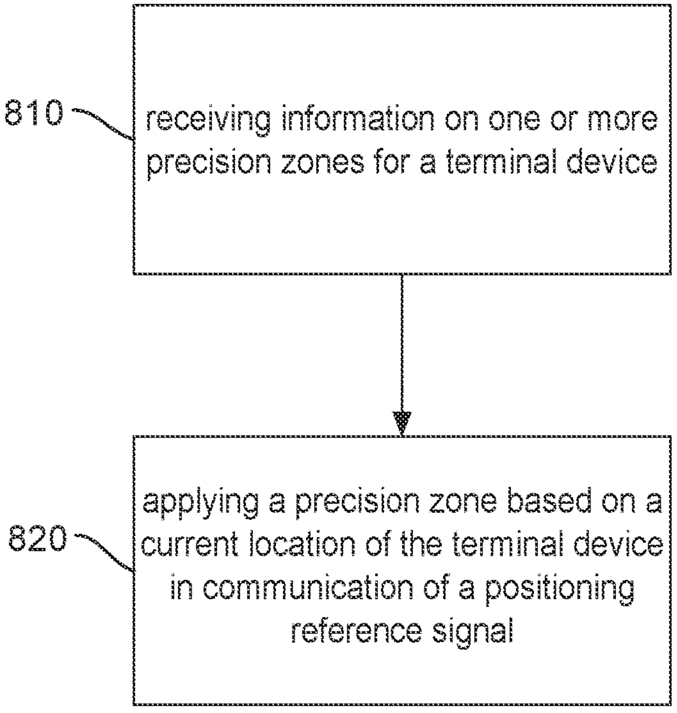
FIG. 8 illustrates an example of a flow diagram of a method according to various exemplary embodiments.

FIG. 8 illustrates an example flow diagram of a method, according to certain example embodiments. In an example embodiment, the method of FIG. 8 may be performed by a network element, or a group of multiple network elements in a 3GPP system, such as LTE or 5G-NR. For instance, in an example embodiment, the method of FIG. 8 may be performed by a UE similar to apparatus 1010 illustrated in FIG. 10.

Figure 10:
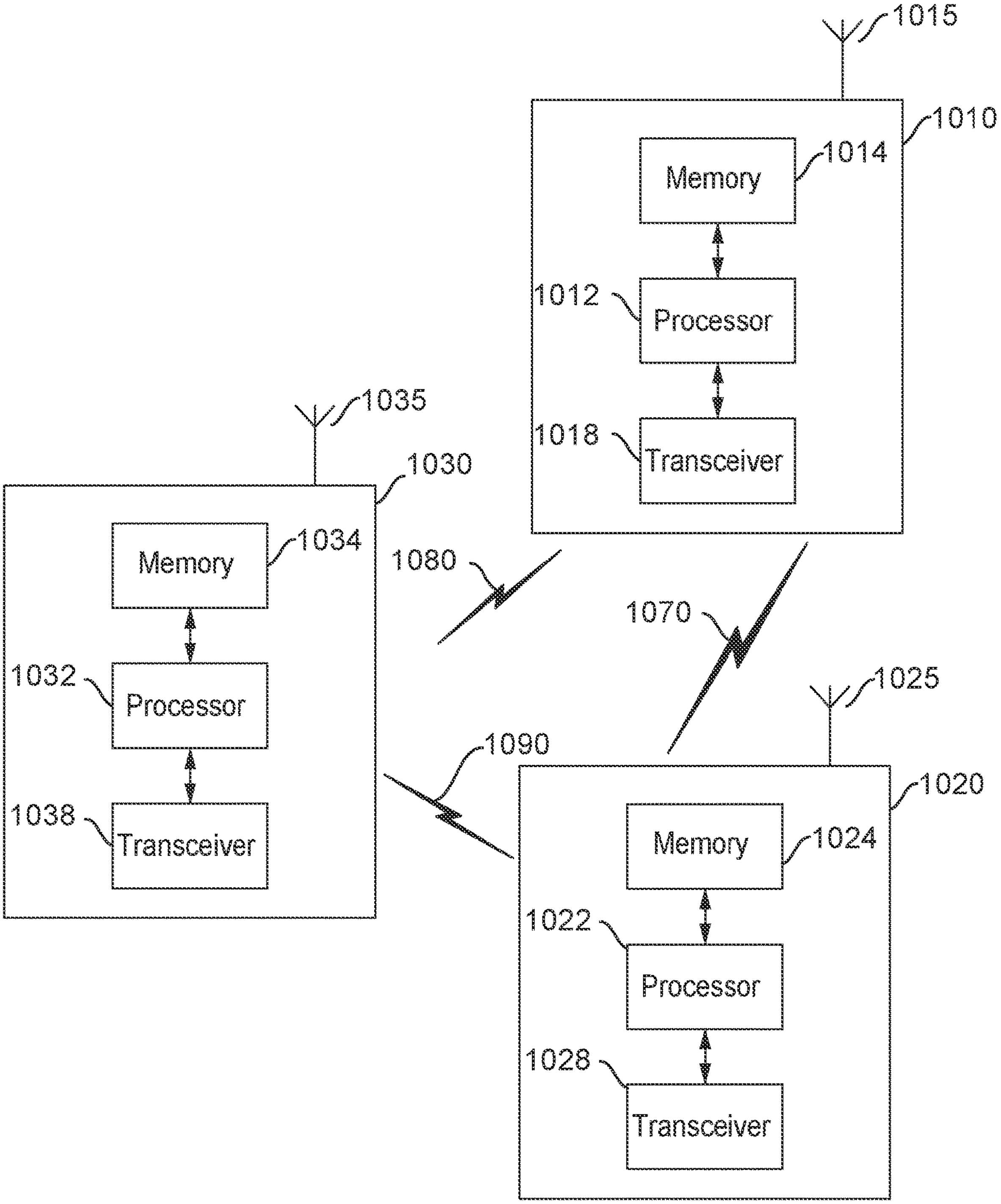
FIG. 10 illustrates a set of apparatuses according to some exemplary embodiments.

According to various exemplary embodiments, the method of FIG. 8 may include, at 810, receiving, from a network element similar to apparatus 1020, information may include a plurality of characteristics of one or more precision zones configured for a terminal device, as similarly shown in FIG. 4. The terminal device may be similar to apparatus 1010, as shown in FIG. 10. At 820, the method may further include applying a precision zone selected from the one or more precision zones in accordance with a current location of the terminal device upon receiving and/or transmitting a reference signal for positioning of the terminal device.

In addition, according to certain exemplary embodiments, another method may be performed by an apparatus similar to apparatus 1020, which is similar to the processes of FIGS. 4 and 5. The method may include receiving a location of a terminal device relative to one or more precision zones. The method may also include generating and transmitting, to the terminal device, a positioning reference signal configured for a precision zone of the one or more precision zones in which the terminal device is located.

Figure 9:
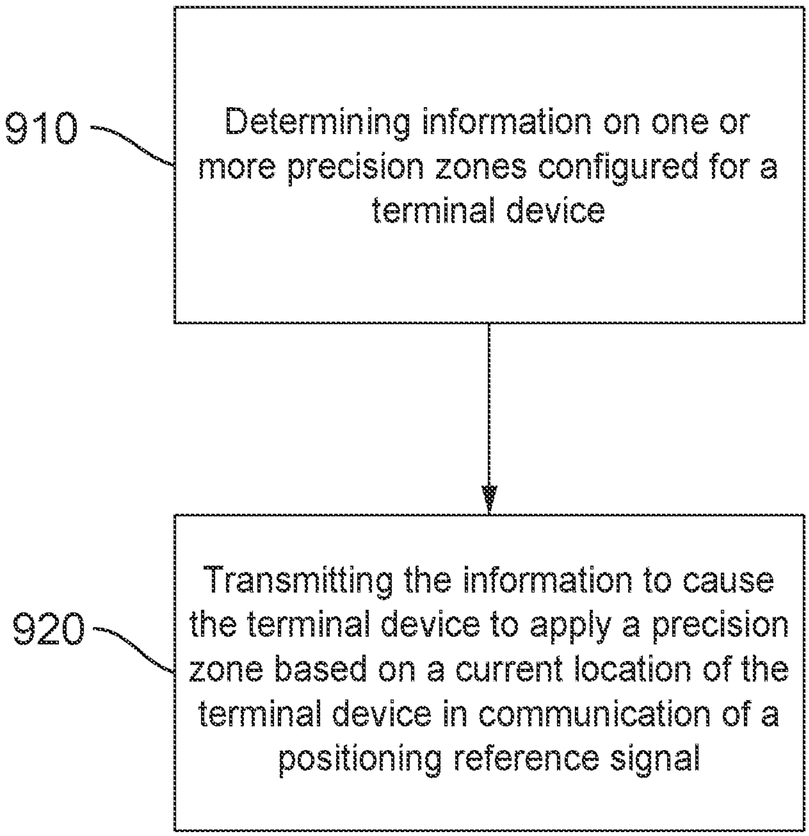
FIG. 9 illustrates another example of a flow diagram of a method according to some exemplary embodiments.

FIG. 9 illustrates an example of a flow diagram of another method, according to certain example embodiments. In an example embodiment, the method of FIG. 9 may be performed by a network entity, or a group of multiple network elements in a 3GPP system, such as LTE or 5G-NR. For instance, in an example embodiment, the method of FIG. 9 may be performed by apparatus 1030 or any other device similar to apparatus 1030 illustrated in FIG. 10.

According to various exemplary embodiments, the method of FIG. 9 may include, at 910, determining information including a plurality of characteristics of one or more precision zones configured for a terminal device, which may be similar to processes of FIG. 6. The terminal device may be similar to apparatus 1030. The method may further include, at 920, transmitting, to the terminal device, the determined plurality of characteristics of one or more precision zones to cause the terminal device to apply a precision zone selected from the one or more precision zones in accordance with a current location of the terminal device upon receiving and/or transmitting a reference signal for positioning of the terminal device.

FIG. 10 illustrates a set of apparatuses 1010, 1020, and 1030 according to various exemplary embodiments. In the various exemplary embodiments, the apparatus 1010 may be an element in a communications network or associated with such a network, such as a UE, RedCap UE, SL UE, mobile equipment (ME), mobile station, mobile device, stationary device, IoT device, or other device. RedCap UEs 101, 201, 301, 401, 501, 601, and 701 may be examples of apparatus 1010 according to various exemplary embodiments as discussed above. Further, SL UEs 701, as shown in FIG. 7, may have structure similar to apparatus 1010 according to various exemplary embodiments as discussed above. It should be noted that one of ordinary skill in the art would understand that apparatus 1010 may include components or features not shown in FIG. 10. In addition, apparatus 1020 may be a network, core network element, or element in a communications network or associated with such a network, such as a base station, an NE, or a gNB. For example, gNBs 402, 502, and 602 may be examples of apparatus 1020 according to various exemplary embodiments as discussed above. It should be noted that one of ordinary skill in the art would understand that apparatus 1020 may include components or features not shown in FIG. 10. In addition, apparatus 1030 may be a part of the core network, a network entity or a sub-component or processing functions of a network entity of computation device connected to the network, such as a location management function (LMF). For example, LMF 403, 503, 603, and 703 may be examples of apparatus 1030 according to various exemplary embodiments as discussed above. It should be noted that one of ordinary skill in the art would understand that apparatus 1030 may include components or features not shown in FIG. 10.

According to various exemplary embodiments, the apparatus 1010 may include at least one processor, and at least one memory, as shown in FIG. 10. The memory may store instructions that, when executed by the processor, cause the apparatus 1010 to receive, from a network element, information including a plurality of characteristics of one or more precision zones configured for the terminal device, as shown in FIG. 4. The network element may similar to apparatus 1020. The apparatus 1010 may be further caused to apply a precision zone selected from the one or more precision zones in accordance with a current location of the terminal device upon transmitting and/or receiving a reference signal for positioning of the terminal device.

According to certain exemplary embodiments, the one or more precision zones may be each associated with a corresponding frequency bandwidth, as shown in FIGS. 2 and 3.

According to some exemplary embodiments, the information may include one or more of zone boundaries, zone boundary uncertainty, and a frequency bandwidth to be used in transmitting and/or receiving in a corresponding precision zone of the one or more precision zones.

According to some exemplary embodiments, the zone boundary uncertainty is based on at least one of a quality of position estimation of the current location of the terminal device, and one or more of the plurality of characteristics of the one or more precision zones.

According to various exemplary embodiments, the apparatus 1010 may be further caused to switch between the one or more precision zones upon a zone change at the terminal device upon transmitting and/or receiving the reference signal for the positioning of the terminal device, as shown in FIG. 3.

According to various exemplary embodiments, the apparatus 1010 may be further caused to select the precision zone from the one or more precision zones in accordance with the current location of the terminal device, and receive transmissions of the reference signal by applying the precision zone for the positioning of the terminal device, which is shown in FIG. 4.

According to certain exemplary embodiments, the apparatus 1010 may be further caused to detect the zone change at the terminal device, and receive subsequent transmissions of the reference signal by applying a different precision zone corresponding to the zone change, as shown in FIG. 4.

According to some exemplary embodiments, the apparatus 1010 may be further caused to indicate, to the network element, the zone change detected at the terminal device, and may receive the subsequent transmissions of the reference signal by applying the different precision zone corresponding to the zone change.

According to some exemplary embodiments, the apparatus 1010 may be further caused to switch from the precision zone to the different precision zone to receive the subsequent transmissions of the reference signal.

According to various exemplary embodiments, the apparatus 1010 may be further caused to measure the received reference signal through one of the following: measure with lower frequency bandwidth when the precision zone or the different precision zone is determined or detected to be in a low precision configuration, and measure with higher frequency bandwidth or a full frequency bandwidth of a configured channel when the precision zone or the different precision zone is determined or detected to be in a high precision configuration.

According to various exemplary embodiments, the measurement with the higher frequency bandwidth or the measurement with the full frequency bandwidth may be performed through at least one or both of: frequency hopping and time multiplexing in the lower frequency bandwidth.

According to certain exemplary embodiments, the reference signal may be a positioning reference signal.

According to various exemplary embodiments, the apparatus 1010 may be further caused to receive, from the network element, an indication of the precision zone corresponding to the current location of the terminal device, and transmit, to the network element, the reference signal by applying the precision zone, as shown in FIG. 4.

According to various exemplary embodiments, the apparatus 1010 may be further caused to send, to the network element, an indication of a different precision zone corresponding to the zone change at the terminal device, and may manage subsequent transmission of the reference signal, to the network element, by applying the different precision zone.

According to various exemplary embodiments, the apparatus 1010 may be further caused to switch from the precision zone to the different precision zone corresponding to manage the subsequent transmission of the reference signal to the network element.

According to certain exemplary embodiments, the apparatus 1010 may be further caused to transmit the reference signal through one of the following: transmit with lower frequency bandwidth when the precision zone or the different precision zone is determined or detected to be in a low precision configuration, and transmit with higher frequency bandwidth or a full frequency bandwidth of a configured channel when the precision zone or the different precision zone is determined or detected to be in a high precision configuration.

According to certain exemplary embodiments, the measurement with the higher frequency bandwidth or the measurement with the full frequency bandwidth may be performed through at least one or both of: frequency hopping and time multiplexing in the lower frequency bandwidth.

According to certain exemplary embodiments, the reference signal may be a sounding positioning reference signal.

According to various exemplary embodiments, the apparatus 1010 may be further caused to receive, over a sidelink with a peer terminal device and from the peer terminal device, transmissions of the reference signal by applying the precision zone, as shown in FIG. 7.

According to various exemplary embodiments, as shown in FIG. 7, the apparatus 1010 may be further caused to obtain an indication of a different precision zone corresponding to the zone change at the terminal device, and receive, over the sidelink and from the peer terminal device, subsequent transmission of the reference signal by applying the different precision zone.

According to various exemplary embodiments, the apparatus 1010 may be further caused to switch from the precision zone to the different precision zone to receive, over the sidelink and from the peer terminal device, the subsequent transmission of the reference signal.

According to some exemplary embodiments, the apparatus 1010 may be further caused to transmit, over a sidelink with a peer terminal device and to the peer terminal device, the reference signal for the positioning of the terminal device, as shown in FIG. 7.

According to some exemplary embodiments, the apparatus 1010 may be further caused to obtain an indication of a different precision zone corresponding to the zone change at the terminal device, and may manage subsequent transmission of the reference signal to the peer terminal device via the sidelink by applying the different precision zone.

According to some exemplary embodiments, the reference signal may be a sidelink positional reference signal for the positioning of the terminal device.

According to various exemplary embodiments, each of the one or more precision zones has a different frequency bandwidth limit of the terminal device.

According to certain exemplary embodiments, the network element performs functions of at least one or both of: a network node (gNB), such as apparatus 1020, and a location management function (LMF), such as apparatus 1030.

Further, according to various exemplary embodiments, the apparatus 1020 may include at least one processor, and at least one memory, as shown in FIG. 10. The memory may store instructions that, when executed by the processor, cause the apparatus 1020 to receive configuration information of a location of a terminal device relative to one or more precision zones. The terminal device may be similar to apparatus 1010. The apparatus 1020 may be further caused to generate and transmit, to the terminal device, a positioning reference signal configured for a precision zone selected from one of the one or more precision zones in which the terminal device is located for positioning of the apparatus 1020, as shown in FIGS. 4 and 5.

According to certain exemplary embodiments, the apparatus 1030 may include at least one processor, and at least one memory, as shown in FIG. 10. The memory may store instructions that, when executed by the processor, cause the apparatus 1030 to determine information including a plurality of characteristics of one or more precision zones configured for a terminal device, as shown in FIGS. 4-7. The terminal device may be similar to apparatus 1010. The apparatus 1030 may be further caused to transmit, to the terminal device, the determined plurality of characteristics of one or more precision zones to cause the terminal device to apply a precision zone selected from the one or more precision zones in accordance with a current location of the terminal device in communication of a reference signal for positioning of the terminal device.

In some example embodiments, an apparatus (for example, apparatuses 1010, 1020, and/or 1030) may include means for performing a method, a process, or any of the variants discussed herein. Examples of the means may include one or more processors, memory, controllers, transmitters, receivers, and/or computer program code for causing the performance of the operations.

According to certain exemplary embodiments, a method may include receiving, from a network element, information including a plurality of characteristics of one or more precision zones configured for a terminal device. The method may also include applying a precision zone selected from the one or more precision zones in accordance with a current location of the terminal device in communication of a reference signal for positioning of the terminal device.

According to some exemplary embodiments, a method may include receiving configuration information of a location of a terminal device relative to one or more precision zones. The method may also include generating and transmitting, to the terminal device, a positioning reference signal configured for a precision zone selected from one of the one or more precision zones in which the terminal device is located for positioning of the terminal device.

According to various exemplary embodiments, a method may include determining information including a plurality of characteristics of one or more precision zones configured for a terminal device. The method may also include transmitting, to the terminal device, the determined plurality of characteristics of one or more precision zones to cause the terminal device to apply a precision zone selected from the one or more precision zones in accordance with a current location of the terminal device in communication of a reference signal for positioning of the terminal device.

Various exemplary embodiments described above may provide several technical improvements, enhancements, and/or advantages. For instance, in some exemplary embodiments, it may be possible to enhance the power management capabilities of the UE while increasing the efficiency of use of network resources.

In some example embodiments, apparatuses 1010, 1020, and/or 1030 may include one or more processors, one or more computer-readable storage medium (for example, memory, storage, or the like), one or more radio access components (for example, a modem, a transceiver, or the like), and/or a user interface. In some example embodiments, apparatuses 1010, 1020, and/or 1030 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 10, apparatuses 1010, 1020, and/or 1030 may include or be coupled to processors 1012, 1022, and 1032, respectively, for processing information and executing instructions or operations. Processors 1012, 1022, and 1032 may be any type of general or specific purpose processor. In fact, processors 1012, 1022, and 1032 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 1012 (1022 and 1032) for each of apparatuses 1010, 1020, and/or 1030 is shown in FIG. 10, multiple processors may be utilized according to other example embodiments. For example, it should be understood that, in certain example embodiments, apparatuses 1010, 1020, and/or 1030 may include two or more processors that may form a multiprocessor system (for example, in this case processors 1012, 1022, and 1032 may represent a multiprocessor) that may support multiprocessing. According to certain example embodiments, the multiprocessor system may be tightly coupled or loosely coupled to, for example, form a computer cluster).

Processors 1012, 1022, and 1032 may perform functions associated with the operation of apparatuses 1010, 1020, and/or 1030, respectively, including, as some examples, precoding of antenna gain/phase parameters, encoding and decoding of individual bits forming a communication message, formatting of information, and overall control of the apparatuses 1010, 1020, and/or 1030, including processes illustrated in FIGS. 3-9.

Apparatuses 1010, 1020, and/or 1030 may further include or be coupled to memory 1014, 1024, and/or 1034 (internal or external), respectively, which may be coupled to processors 1012, 1022, and 1032, respectively, for storing information and instructions that may be executed by processors 1012, 1022, and 1032. Memory 1014 (memory 1024 and 1034) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 1014 (memory 1024 and 1034) can be comprised of any combination of random access memory (RAM), read only memory (ROM), static storage such as a magnetic or optical disk, hard disk drive (HDD), or any other type of non-transitory machine or computer readable media. The instructions stored in memory 1014, memory 1024, and memory 1034 may include program instructions or computer program code that, when executed by processors 1012, 1022, and 1032, enable the apparatuses 1010, 1020, and/or 1030 to perform tasks as described herein.

In certain example embodiments, apparatuses 1010, 1020, and/or 1030 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 1012, 1022, and 1032 and/or apparatuses 1010, 1020, and/or 1030 to perform any of the methods illustrated in FIGS. 3-9.

In some exemplary embodiments, apparatuses 1010, 1020, and/or 1030 may also include or be coupled to one or more antennas 1015, 1025, and 1035, respectively, for receiving a downlink signal and for transmitting via an uplink from apparatuses 1010, 1020, and/or 1030. Apparatuses 1010, 1020, and/or 1030 may further include transceivers 1018, 1028, and 1038, respectively, configured to transmit and receive information. The transceivers 1018, 1028, and 1038 may also include a radio interface (for example, a modem) respectively coupled to the antennas 1015, 1025, and 1035. The radio interface may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 1018, 1028, and 1038 may be respectively configured to modulate information on to a carrier waveform for transmission by the antenna(s) 1015, 1025, and 1035, and demodulate information received via the antenna(s) 1015, 1025, and 1035 for further processing by other elements of apparatuses 1010, 1020, and/or 1030.

In other example embodiments, transceivers 1018, 1028, and 1038 may be capable of transmitting and receiving signals or data directly. Additionally or alternatively, in some example embodiments, apparatuses 1010, 1020, and/or 1030 may include an input and/or output device (I/O device). In certain example embodiments, apparatuses 1010, 1020, and/or 1030 may further include a user interface, such as a graphical user interface or touchscreen.

In certain example embodiments, memory 1014, memory 1024, and memory 1034 store software modules that provide functionality when executed by processors 1012, 1022, and 1032, respectively. The modules may include, for example, an operating system that provides operating system functionality for apparatuses 1010, 1020, and/or 1030. The memory may also store one or more functional modules, such as an application or program, to provide additional functionality for apparatuses 1010, 1020, and/or 1030. The components of apparatuses 1010, 1020, and/or 1030 may be implemented in hardware, or as any suitable combination of hardware and software. According to certain example embodiments, apparatus 1010 may optionally be configured to communicate with apparatus 1020 and/or 1030 via a wireless or wired communications links 1070, 1080, and/or 1090 according to any radio access technology, such as NR.

According to certain example embodiments, processors 1012, 1022, and 1032, and memory 1014, 1024, and 1034 may be included in or may form a part of processing circuitry or control circuitry. In addition, in some example embodiments, transceivers 1018, 1028, and 1038 may be included in or may form a part of transceiving circuitry.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 1010, 1020, and/or 1030) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 1010, 1020, and/or 1030), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network

5GS 5G System
BW Bandwidth
BWP Bandwidth Part
CCE Control Channel Element
DL Downlink
DL-TDOA Downlink Time Difference of Arrival
EMBB Enhanced Mobile Broadband
FR1 Frequency Range 1
FR2 Frequency Range 2
GDOP Geometric Dilution of Precision
gNB 5G or Next Generation NodeB
LMF Location Management Function
LPHAP Low Power High Accuracy Positioning
LTE Long Term Evolution
MIB Master Information Block
NR New Radio
RedCap Reduced capability NR
RRC Radio Resource Control
RSRP Reference Signal Received Power
SL Sidelink
SRS Sounding Reference Signal
SS-RSRP Synchronization Signal Reference Signal Received Power
SS-RSRQ Synchronization Signal Reference Signal Received Quality
SS-SINR Synchronization Signal-Signal to Interference plus Noise Ratio
SSB Synchronization Signal Block
TA Timing Advance
TOA Time of Arrival
TRP Transmission Reception Point
UE User Equipment
UL Uplink
UL-TDOA Uplink time Difference of Arrival
URLLC Ultra Reliable Low Latency Communication

We claim:

1. A terminal device, comprising:
at least one processor; and
at least one memory storing instructions that, when executed by the at least one processor, cause the terminal device at least to:
receive, from a network element, information comprising a plurality of characteristics of a geo-fence having two or more precision zones configured for two or more positioning uncertainties for the terminal device;
apply a precision zone selected from the two or more precision zones in accordance with a current location of the terminal device in communication of a reference signal for positioning of the terminal device.

2. The terminal device of claim 1, wherein the two or more precision zones are each associated with a corresponding frequency bandwidth.

3. The terminal device of claim 1, wherein the information comprises two or more of zone boundaries, zone boundary uncertainty, and a frequency bandwidth to be used in transmitting and/or receiving the reference signal for positioning of the terminal device in a corresponding precision zone of the two or more precision zones.

4. The terminal device of claim 3, wherein the zone boundary uncertainty is based on at least one of a quality of position estimation of the current location of the terminal device, and one or more of the plurality of characteristics of the two or more precision zones.

5. The terminal device of claim 1, wherein the terminal device is at least caused to:
switch between the two or more precision zones upon a zone change at the terminal device during the communication of the reference signal for the positioning of the terminal device.

6. The terminal device of claim 1, wherein the terminal device is at least caused to:
select the precision zone from the two or more precision zones in accordance with the current location of the terminal device; and
receive transmissions of the reference signal by applying the first precision zone for the positioning of the terminal device.

7. The terminal device of claim 6, wherein the terminal device is at least caused to:
detect the zone change at the terminal device; and
receive subsequent transmissions of the reference signal by applying a different precision zone corresponding to the zone change, wherein the different precision zone having a different positioning uncertainty.

8. The terminal device of claim 7, wherein the terminal device is at least caused to:
indicate, to the network element, the zone change detected at the terminal device; and
receive the subsequent transmissions of the reference signal by applying the different precision zone corresponding to the zone change.

9. The terminal device of claim 8, wherein the terminal device is at least caused to:
switch from the precision zone to the different precision zone to receive the subsequent transmissions of the reference signal.

10. The terminal device of claim 9, wherein the terminal device is at least caused to measure the received reference signal through one of the following:
measure with lower frequency bandwidth when the precision zone or the different precision zone is determined or detected to be in a low precision configuration, and
measure with higher frequency bandwidth or a full frequency bandwidth of a configured channel when the precision zone or the different precision zone is determined or detected to be in a high precision configuration.

11. The terminal device of claim 10, wherein the measurement with the higher frequency bandwidth or the measurement with the full frequency bandwidth is performed through at least one or both of: frequency hopping and time multiplexing in the lower frequency bandwidth.

12. The terminal device of claim 1, wherein the reference signal is a positioning reference signal.

13. The terminal device of claim 5, wherein the terminal device is at least caused to:
receive, from the network element, an indication of the precision zone corresponding to the current location of the terminal device; and
transmit, to the network element, the reference signal by applying the precision zone.

14. The terminal device of claim 13, wherein the terminal device is at least caused to:
send, to the network element, an indication of a different precision zone corresponding to the zone change at the terminal device; and
manage subsequent transmission of the reference signal, to the network element, by applying the different precision zone.

15. The terminal device of claim 14, wherein the terminal device is at least caused to:

switch from the precision zone to the different precision zone corresponding to managing the subsequent transmission of the reference signal to the network element.

16. The terminal device of claim 15, wherein the terminal device is at least caused to transmit the reference signal through one of the following:

transmit with lower frequency bandwidth when the precision zone or the different precision zone is determined or detected to be in a low precision configuration, and transmit with higher frequency bandwidth or a full frequency bandwidth of a configured channel when the precision zone or the different precision zone is determined or detected to be in a high precision configuration.

17. The terminal device of claim 1, wherein the terminal device is at least caused to:

transmit, over a sidelink with a peer terminal device and to the peer terminal device, the reference signal for the positioning of the terminal device.

18. The terminal device of claim 17, wherein the terminal device is at least caused to:

obtain an indication of a different precision zone corresponding to the zone change at the terminal device; and manage subsequent transmission of the reference signal to the peer terminal device via the sidelink by applying the different precision zone.

19. A network device, comprising:

at least one processor; and at least one memory storing instructions that, when executed by the at least one processor, cause the network device at least to:

receive configuration information of a location of a terminal device relative to a geo-fence having two or more precision zones configured for two or more positioning uncertainties for the terminal device; and generate and transmit, to the terminal device, a positioning reference signal configured for a precision zone selected from one of the two or more precision zones in which the terminal device is located for positioning of the terminal device.

20. A network device, comprising:

at least one processor; and at least one memory storing instructions that, when executed by the at least one processor, cause the network device at least to:

determine information comprising a plurality of characteristics of a geo-fence having two or more precision zones configured for two or more positioning uncertainties for a terminal device; and transmit, to the terminal device, the determined plurality of characteristics of the two or more precision zones to cause the terminal device to apply a precision zone selected from the two or more precision zones in accordance with a current location of the terminal device in communication of a reference signal for positioning of the terminal device.

* * * * *